(12) United States Patent
Katahara et al.

(10) Patent No.: US 6,867,939 B2
(45) Date of Patent: Mar. 15, 2005

(54) DISK UNIT AND INFORMATION PROCESSING APPARATUS

(75) Inventors: Naotoshi Katahara, Kawasaki (JP); Eiichi Ebihara, Kawasaki (JP); Takashi Aikawa, Kawasaki (JP); Akihiko Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 09/888,896

(22) Filed: Jun. 25, 2001

(65) Prior Publication Data

US 2002/0114095 A1 Aug. 22, 2002

(30) Foreign Application Priority Data

Feb. 21, 2001 (JP) ...................................... 2001-044488

(51) Int. Cl.⁷ ............................................... G11B 5/09
(52) U.S. Cl. ....................................................... 360/53
(58) Field of Search ............................. 360/53, 78.14, 360/45, 133, 41, 60, 97.03, 97.02, 97.04, 69; 369/45; 399/41

(56) References Cited

U.S. PATENT DOCUMENTS

| | | | | |
|---|---|---|---|---|
| 4,980,786 A | * | 12/1990 | O'Sullivan et al. | 360/97.03 |
| 5,594,603 A | * | 1/1997 | Mori et al. | 360/78.04 |
| 6,046,871 A | * | 4/2000 | Schaenzer et al. | 360/31 |
| 6,236,532 B1 | * | 5/2001 | Yanagisawa | 360/97.02 |
| 6,335,843 B2 | * | 1/2002 | Yotsuya et al. | 360/60 |
| 6,385,007 B1 | * | 5/2002 | Li | 360/97.02 |
| 6,409,380 B1 | * | 6/2002 | Fukuzono et al. | 374/28 |
| 6,530,034 B1 | * | 3/2003 | Okada et al. | 714/5 |

FOREIGN PATENT DOCUMENTS

| | | | | |
|---|---|---|---|---|
| DE | 100 20 623 | | 11/2000 | |
| EP | 0 486 178 | | 5/1992 | |
| EP | 0 497 230 | | 8/1992 | |
| GB | 2 190 231 | | 11/1987 | |
| JP | 57-205875 | | 12/1982 | |
| JP | 03-091185 | | 4/1991 | |
| JP | 05-109261 | * | 4/1993 | ............ G11B/33/14 |
| JP | 05-174565 | | 7/1993 | |
| JP | 10320724 A | * | 9/1999 | ............ G11B/5/40 |

* cited by examiner

Primary Examiner—Sinh Tran
Assistant Examiner—Glenda P. Rodriguez
(74) Attorney, Agent, or Firm—Greer, Burns & Crain, Ltd.

(57) ABSTRACT

A disk unit, such as a magnetic disk unit, has a temperature sensor, a humidity sensor, a heater, a Peltier element, etc. The disk unit heats and cools in accordance with temperature and humidity. The disk unit has a double-structure of outline comprising a first outline and a second outline surrounding said first outline, so that an internal environment is isolated from an external environment.

30 Claims, 6 Drawing Sheets

DISK UNIT AND INFORMATION PROCESSING APPARATUS

BACKGROUND OF THE INVENTION

1. Field of the Invention

The present invention relates to a disk unit in which an actuator having a head on the top is actuated, while a disk is rotated, so that a position of the head is moved with respect to the disk to perform write and read of data to and from the disk by the head.

2. Description of the Related Art

Hitherto, as memory devices of a computer, there are widely used disk units such as a magnetic disk unit and a magneto-optical disk unit. The disk unit is restricted in a using temperature range to, for example, 5° C.~55° C. Further, also with respect to the temperature variation of the using environment, a temperature gradient is restricted to be not larger than 20° C. per hour. In this manner, the disk unit is ensured a normal operation in such a manner that a user side of the disk unit pays one's attention with respect to the using environment.

In the explanation of a magnetic disk unit by way of example, the magnetic disk unit is expanded in an application field in view of the fact that a memory capacity is large and read and write are free. For example, the magnetic disk unit is adopted for a car navigation system adopting a GPS (Global Positioning System) as a memory unit for renewal data storage, and is loaded onto a car.

However, for example, in the event that the magnetic disk unit is loaded onto a car, the using environment is greatly changed from that in a room. There is a high possibility that the magnetic disk unit is placed under an extremely low temperature of less than −30° C. and an extremely high temperature of more than 80° C. This involves such a problem that the magnetic disk unit, which is restricted in a using temperature range to 50° C.~55° C., is no longer usable.

SUMMARY OF THE INVENTION

In view of the foregoing, it is an object of the present invention to provide a disk unit operable under the broader environmental condition as compared with the prior art, and an information processing apparatus provided with such a disk unit.

To achieve the above-mentioned object, the present invention provides a first disk unit in which an arm having a head on a top is actuated, while a disk is rotated, so that a position of the head is moved with respect to the disk to perform write and read of data to and from the disk by the head, said disk unit comprising:

a temperature sensor for detecting a temperature; and heating means for heating when said temperature sensor detects a temperature which is less than a predetermined first temperature.

Heating makes it possible spread an operable environment to a low temperature side.

In the first disk unit according to the present invention as mentioned above, it is acceptable that said disk unit further comprises a first motor for driving said disk, and said heating means includes means for heating by conducting a current through a fixed phase of said first motor.

To achieve the above-mentioned object, the present invention provides a second disk unit in which an arm having a head on a top is actuated, while a disk is rotated, so that a position of the head is moved with respect to the disk to perform write and read of data to and from the disk by the head, said disk unit comprising:

a temperature sensor for detecting a temperature;

a clock generating circuit for generating a plurality of sorts of operational clocks which are mutually different in frequency; and a control circuit for controlling an operation of said disk unit in such a manner that upon receipt of any one sort of operational clock from said clock generating circuit, a processing is performed at a processing speed according to a frequency of the received operational clock, wherein said control circuit operates at an operational clock different in accordance with a temperature.

To achieve the above-mentioned object, the present invention provides a third disk unit in which an arm having a head on a top is actuated, while a disk is rotated, so that a position of the head is moved with respect to the disk to perform write and read of data to and from the disk by the head, said disk unit comprising:

a temperature sensor for detecting a temperature; and an access circuit for accessing said disk, wherein said access circuit performs, when writing of data into said disk is performed in a case where said temperature sensor detects a temperature which is out of a predetermined temperature range, a writing confirmation operation for comparing written data with read data through reading data written into said disk.

To achieve the above-mentioned object, the present invention provides a fourth disk unit in which an arm having a head on a top is actuated, while a disk is rotated, so that a position of the head is moved with respect to the disk to perform write and read of data to and from the disk by the head, said disk unit comprising:

a humidity sensor for detecting a humidity; and heating means for heating when said humidity sensor detects a humidity exceeding a predetermined humidity.

Heating makes it possible to prevent condensation and spread an operable environment to a high humidity side.

To achieve the above-mentioned object, the present invention provides a fifth disk unit in which an arm having a head on a top is actuated, while a disk is rotated, so that a position of the head is moved with respect to the disk to perform write and read of data to and from the disk by the head, said disk unit comprising:

a humidity sensor for detecting a humidity; and an access circuit for accessing said disk, wherein said access circuit performs, when writing of data into said disk is performed in a case where said humidity sensor detects a humidity exceeding a predetermined humidity, a writing confirmation operation for comparing written data with read data through reading data written into said disk.

To achieve the above-mentioned object, the present invention provides a sixth disk unit in which an arm having a head on a top is actuated, while a disk is rotated, so that a position of the head is moved with respect to the disk to perform write and read of data to and from the disk by the head, said disk unit comprising:

a double-structure of outline comprising a first outline and a second outline surrounding said first outline.

Adoption of the double-structure of outline makes it hard to be affected by an external environment, and thereby spreading the operable environment.

To achieve the above-mentioned object, the present invention provides an information processing apparatus having a disk unit for performing reading and writing of information for a disk of the disk unit via an interface, said information processing apparatus comprising:

a temperature sensor for detecting a temperature; and a control circuit for controlling a heating value of said disk unit in accordance with a temperature detected by said temperature sensor.

In the information processing apparatus according to the present invention as mentioned above, it is acceptable that said control circuit causes a current to conduct through a fixed phase of a motor for rotating a disk of said disk unit, when said temperature sensor detects a temperature which is lower than a predetermined temperature.

In the information processing apparatus according to the present invention as mentioned above, it is acceptable that when said temperature sensor detects a temperature which is out of a predetermined temperature range, said disk unit informs via said interface that said disk unit is not operable.

DETAILED DESCRIPTION OF PREFERRED EMBODIMENTS

Embodiments of the present invention will be described with reference to the accompanying drawings.

Figure 2:
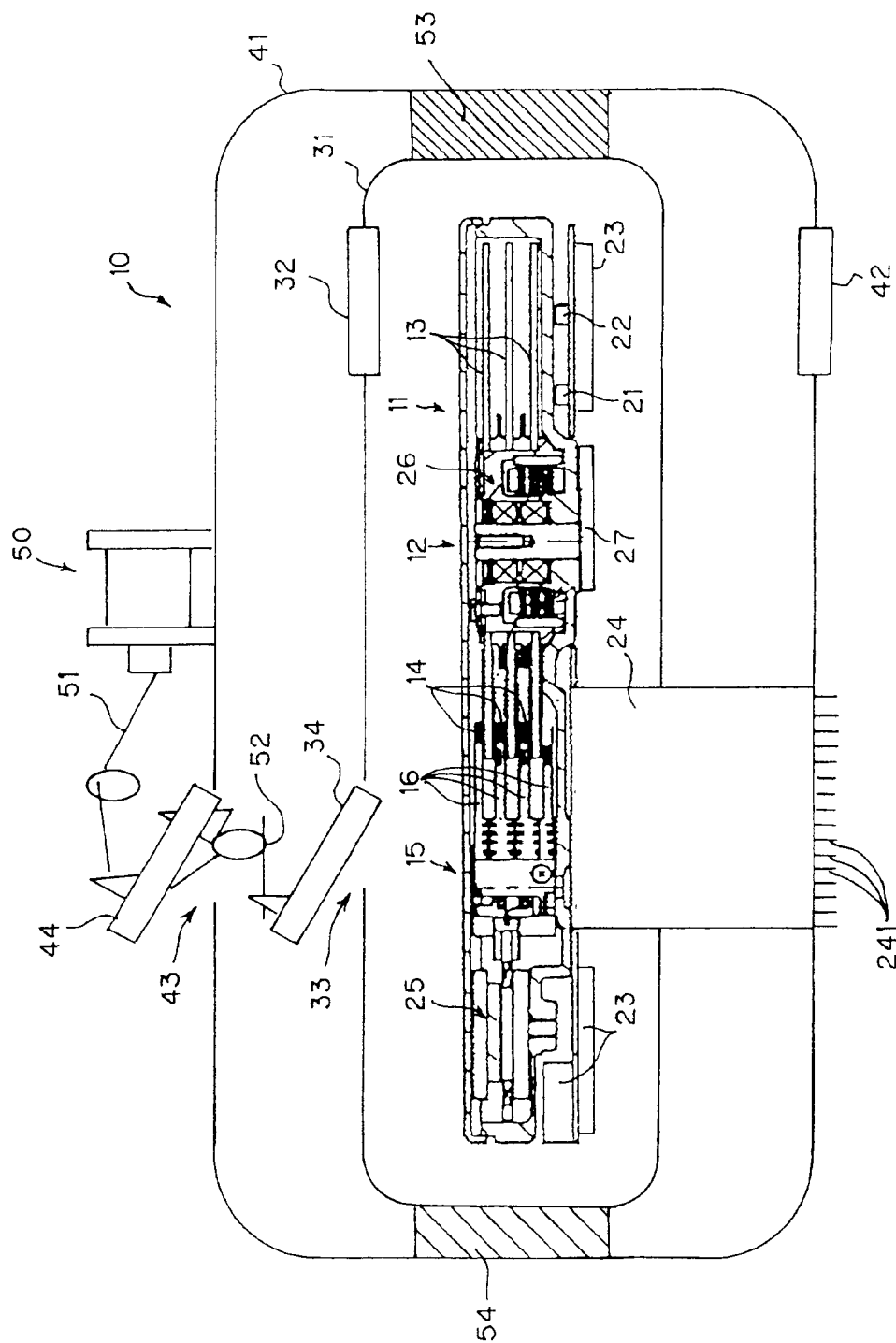
FIG. 2 is a sectional view of a magnetic disk unit according to an embodiment of the present invention.

A movable section 11 of a magnetic disk unit comprises: a magnetic disk 13 which is driven on a rotary shaft 12 by a disk control motor (DCM) 26 (cf. FIG. 2); a carriage arm 16 which rotates on a rotary shaft 15, said carriage arm having a magnetic head 14 opposing the magnetic disk 13 on its top; and an actuator 17 for driving the carriage arm 16 on a rotary basis by a voice coil motor (VCM) 25 (cf. FIG. 2). To write data into the magnetic disk 13 or to read data from the magnetic disk 13, the carriage arm 16 is driven by the VCM provided on the actuator 17 in a state that the magnetic disk 13 is driven by the DCM, and the magnetic head 14 of the top of the carriage arm 16 is positioned to a desired track of the magnetic disk 13, so that the magnetic head 14 magnetically writes data on the desired track of the magnetic disk 13 sequentially as the magnetic head 14 rotates, or magnetically reads data from the desired track of the magnetic disk 13 sequentially as the magnetic head 14 rotates.

FIG. 2 is a sectional view of a magnetic disk unit according to an embodiment of the present invention.

Figure 1:
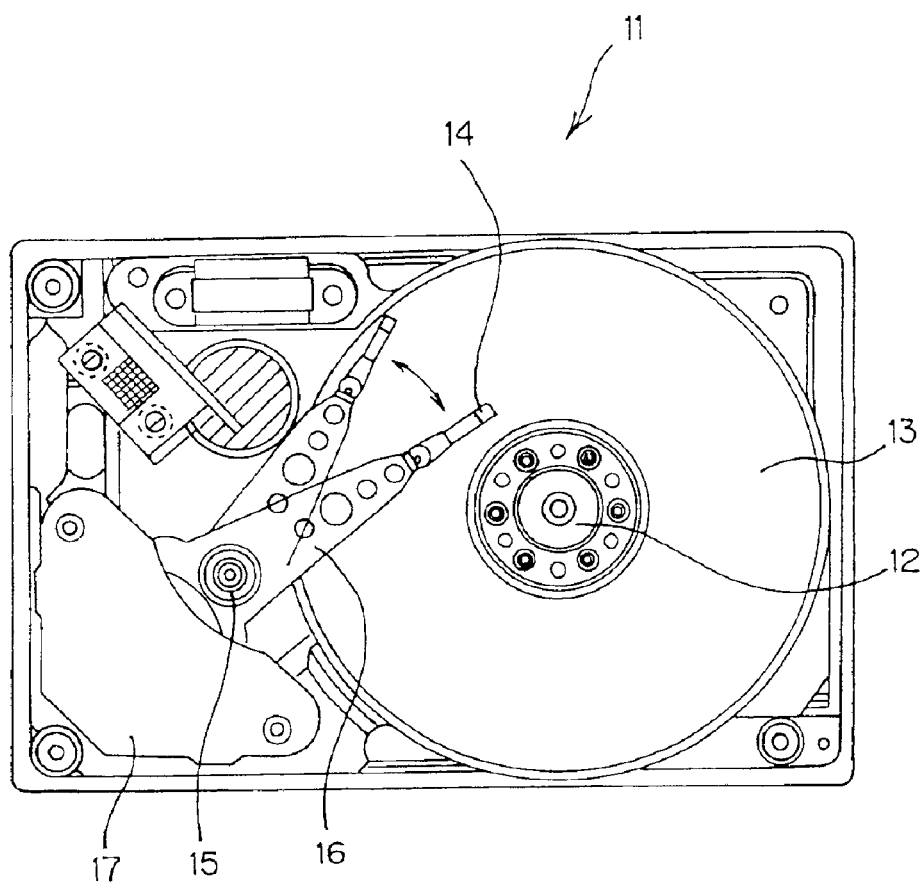
FIG. 1 is an explanatory view of a movable section of a magnetic disk unit.

A magnetic disk unit 10 shown in FIG. 2 has such a structure that the movable section 11 also shown in FIG. 1 is disposed at the center, the periphery of the movable section 11 is covered by a first outline 31, and the first outline 31 is covered by a second outline 41.

In this manner, the magnetic disk unit 10 is covered by a double-structure of outline comprising the first outline 31 and the second outline 41. This structure makes it possible in conjunction with means for heating and cooling and the like, which will be described later, to place the movable section 11 under the good operating environment.

The movable section 11 further comprises a temperature sensor 21 and a humidity sensor 22 in addition to the elements referenced to in FIG. 1. The temperature sensor 21 and the humidity sensor 22 are used for a measurement of the operational environment for the movable section 11. The movable section 11 furthermore comprises a control circuit 23, which will be described in detail in conjunction with FIG. 3, a Peltier element 24 for heating and cooling the movable section 11, and a heater 27 for heating particularly the DCM 26 of the movable section 11. The Peltier element 24 has heat sinks 241 at extended portions from the second outline 41 to enhance a radiation efficiency of heat generated when the movable section 11 is cooled. The reason why the heater 27 is disposed at the position of the DCM 26 is that under the low temperature there is a possibility that a size of a ball bearing supporting a rotary shaft of the DCM 26 is reduced and as a result the rotary shaft brings about a run-out. The run-out of the rotary shaft causes a possibility that there occurs such an accident that the magnetic head 14 comes in contact with the magnetic disk 13, and as a result the magnetic disk 13 is damaged, or a possibility that writing or reading errors occur.

The first outline 31 of the double-structure of outline is provided with an air vent 32 permitting a controlled amount of air to be passed through. The first outline 31 is further provided with an aperture 33, which may be closed optionally by a door 34.

Likely, the second outline 41 of the double-structure of outline is provided with an air vent 42 permitting a controlled amount of air to be passed through. The second outline 41 is also further provided with an aperture 43, which may be closed optionally by a door 44.

An outline door switching solenoid 50 is fixed on the second outline 41. In order to open the door, the outline door switching solenoid 50 is enabled in accordance with an instruction from a control circuit shown in FIG. 3, so that the door 44 is attracted via a driving spring 51 to be opened and thereby opening the aperture 43. And the door 34 is attracted via a coupling spring 52 to be opened and thereby opening the aperture 33. When the outline door switching solenoid 50 is disabled, the driving spring 51 is urged by a spring (not illustrated) inside the outline door switching solenoid 50 so that the driving spring 51 pushes the door 44 to close the aperture 43. And the coupling spring 52 pushes the door 34 to close the aperture 33.

On a path coupling the two air vents 32 and 42 by the short distance in a space formed between the first outline 31 and the second outline 41, there is provided a small silica gel 53. On the other hand, on a path coupling the two air vents 32 and 42 by the long distance in a space formed between the first outline 31 and the second outline 41, there is provided a large silica gel 54. When the door 34 and 44 closes the apertures 33 and 43, respectively, passages for the air are formed only via the two air vents 32 and 42 on the inside of the first outline 31 and the outside of the second outline 41, respectively. As mentioned above, there is provided the small silica gel 53 on the path coupling the two air vents 32 and 42 by the short distance, and there is provided the large silica gel 54 on the path coupling the two air vents 32 and 42 by the long distance. Those silica gels 53 and 54 serve to remove humidity of the air passing through between the two air vents 32 and 42. With respect to the path coupling the two air vents 32 and 42 by the short distance, the use of the small silica gel 53 makes it difficult that the air passes through. On the other hand, with respect to the path coupling the two air vents 32 and 42 by the long distance, the use of the large silica gel 54 makes it easy that the air passes through. Thus, the air, which passes through between the first outline 31 and the second outline 41, is introduced as a whole to the path by the long distance. Formation of the passage for air by the bypass in this manner makes it possible to reduce an interchange of air between the inside of the first outline 31 and the outside of the second outline 41, and makes it easy to maintain the environment suitable for the operation of the unit with isolation of the inside from the outside.

Figure 3:
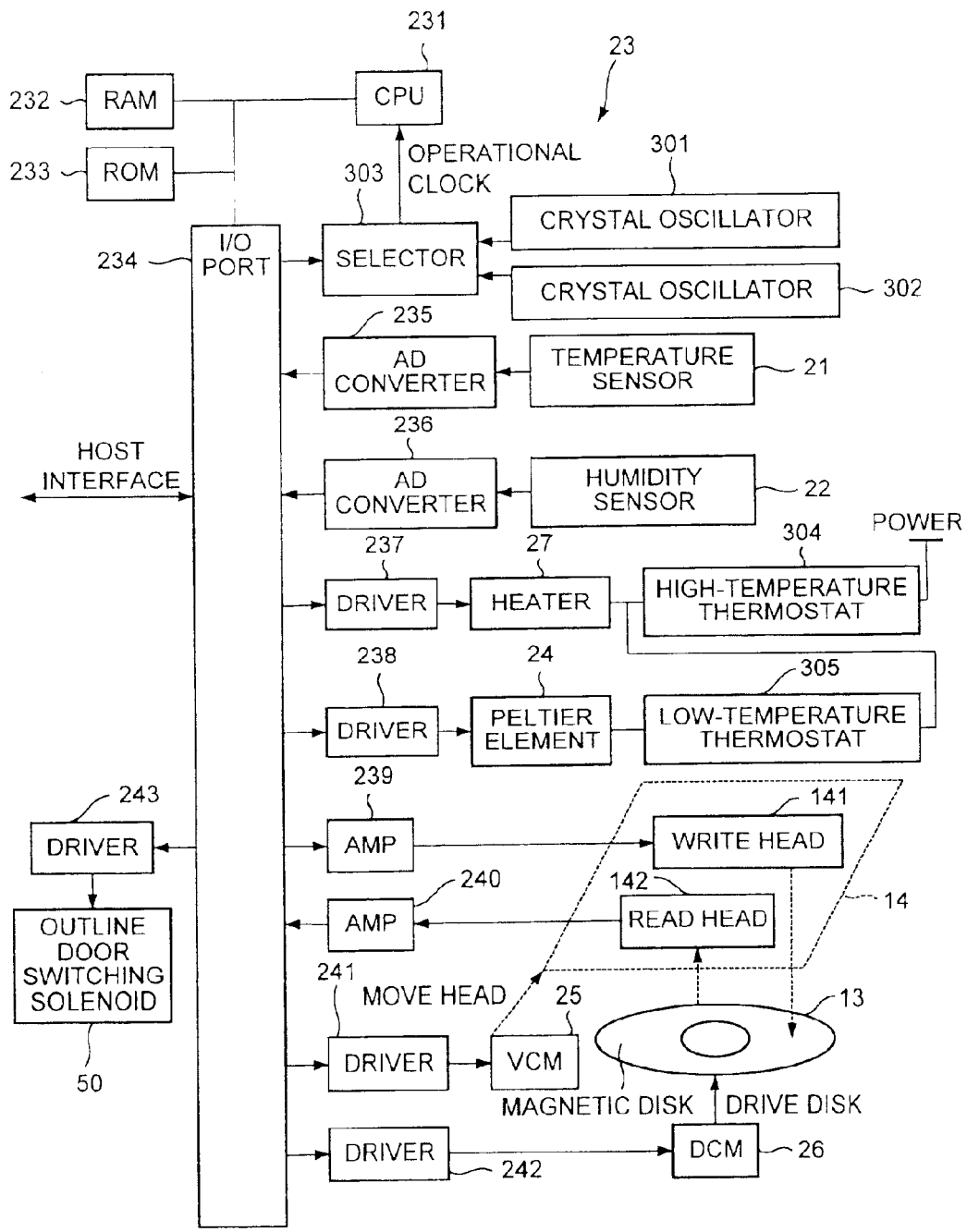
FIG. 3 is a block diagram of a control circuit of the magnetic disk unit showing in FIG. 2.

FIG. 3 is a block diagram of a control circuit of the magnetic disk unit showing in FIG. 2.

A control circuit 23 comprises a CPU 231, a RAM 232, a ROM 233 and an I/O port 234.

The control circuit 23 further comprises a 100 MHz crystal oscillator 301 for generating an operational clock of frequency 100 MHz, and a 66 MHz crystal oscillator 302 for generating an operational clock of frequency 66 MHz. The two operational clocks are fed to a selector 303. One of the two operational clocks, which is selected by the selector 303, is fed to the CPU 231. The CPU 231 operates at the speed according to the operational clock fed thereto. Switching of the operational clock by the selector 303 is performed in accordance with an instruction from the I/O port 234 upon receipt of an instruction from the CPU 231.

The ROM 233 stores therein various sorts of control programs to control the magnetic disk unit. The CPU 231 executes the control programs. The RAM 232 is used as a working area when the CPU 231 executes the control programs, and also as a temporal storage area for data to be written into the magnetic disk 13 and data read from the magnetic disk 13.

The I/O port 234 has functions of receiving data from the exterior to transmit the same to the CPU 231 and of outputting an instruction of the CPU 231 to the exterior.

Signals, which are representative of temperature and humidity from the temperature sensor 21 and the humidity sensor 22 (also shown in FIG. 2), respectively, are converted into digital data by AD converters 235 and 236, respectively. The digital data thus converted are fed to the I/O port 234 and then transmitted to the CPU 231. The I/O port 234 issues instructions to a driver 237 in accordance with an instruction of the CPU 231, so that the driver 237 turns on or off the heater 27 in accordance with the instruction. In a similar fashion to this, the I/O port 234 causes the Peltier element 24 to operate in heating side or cooling side, or to stop the operation in accordance with an instruction of the CPU 231.

The control circuit 23 further comprises a high-temperature thermostat 304 and a low-temperature thermostat 305. For the purpose of safety, when the high-temperature thermostat 304 is operated, conduction to the heater 27 and the Peltier element 24 is interrupted without an instruction from the CPU 231 to stop the operation of the heater 27 and the Peltier element 24 and thereby preventing too much generation of heat. When the low-temperature thermostat 305 is operated, conduction to the Peltier element 24 is interrupted without an instruction from the CPU 231 to stop the operation of the Peltier element 24 and thereby preventing too much cooling.

The I/O port 234 issues instructions to a driver 242 in accordance with an instruction of the CPU 231, so that the driver 242 drives the DCM 26 to drive the magnetic disk 13. Further, the I/O port 234 issues instructions to a driver 241 in accordance with an instruction of the CPU 231, so that the driver 241 drives the VCM 25 to drive the carriage arm 16 shown in FIG. 1 and thereby moving the magnetic head 14 provided on the top of the carriage arm 16.

The magnetic head 14 comprises a WRITE head 141 for performing writing of data into the magnetic disk 13 and a READ head 142 for performing reading of data from the magnetic disk 13. When data is written into the magnetic disk 13, the data is transmitted from the I/O port 234 via an amplifier 239 to the WRITE head 141, so that the WRITE head 141 magnetically writes the data into the magnetic disk 13.

When data is read from the magnetic disk 13, data stored in the magnetic disk 13 is magnetically picked up by the READ head 142 and converted into an electric signal. The electric signal is fed in form of read data via an amplifier 240 to the I/O port 234.

A driver 243 switches the outline door switching solenoid 50 in accordance with an instruction of the I/O port 234 upon receipt of an instruction of the CPU 231.

Further, the I/O port 234 performs a communication with a host system (not illustrated) so that the I/O port 234 receives necessary instructions from the host system and transmits the same to the CPU 231 or makes a necessary report for the host system in accordance with instructions from the CPU 231.

The driver 242 drives the DCM 26 to rotate the magnetic disk 13 at a constant speed. This driver 242 is constructed in such a manner that the driver 242 drives the DCM 26 drawing a distinction between an operation in which the magnetic disk 13 is rotated at a predetermined rotary speed and a current conducting through a winding of the DCM 26 is suppressed, and an operation in which the magnetic disk 13 is rotated at a predetermined rotary speed and a current is conducted through a winding of the DCM 26 as much as possible to promote a generation of heat (the later operation is referred to as a heat generating operation).

According to the present embodiment, when the carriage arm 16 shown in FIG. 1 is not operated, the carriage arm 16 moves to a position rather near the rotary shaft 12 of the magnetic disk 13 and stands by. The driver 241 drives the VCM 25 drawing a distinction between an operation in which when the carriage arm 16 is in the standby condition, a current conducting through the VCM 25 is stopped or restricted to the minimum value, and an operation in which even when the carriage arm 16 is in the standby condition, a current conducting through the VCM 25 is maintained to drive the VCM 25 in a direction that the carriage arm 16 further approach the rotary shaft 12 of the magnetic disk 13 and thereby promoting a generation of heat (the later operation is also referred to as a heat generating operation).

Figure 4:
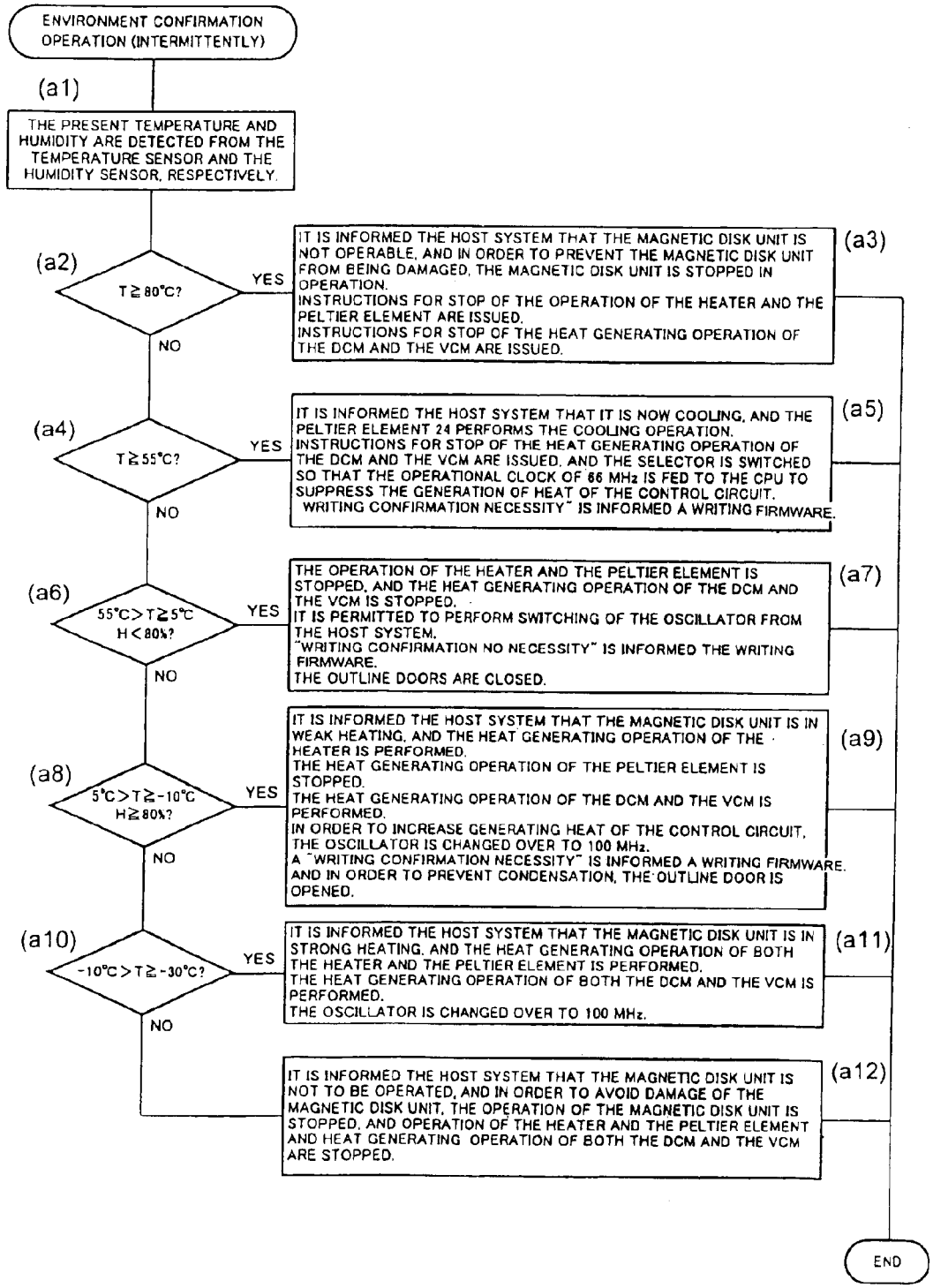
FIG. 4 is a flowchart useful for understanding a program for environment confirmation operation execution.

FIG. 4 is a flowchart useful for understanding a program for environment confirmation operation execution, which is related to the present invention, of various sorts of programs to be executed in the CPU in FIG. 3. This program is repeatedly carried out at regular time intervals.

When an execution of this program is initiated, first, the present temperature and humidity are detected from the temperature sensor 21 and the humidity sensor 22 shown in FIGS. 2 and 3, respectively (step a1), and the following operation is performed in accordance with the detected temperature and humidity.

Of the temperature and humidity detected in the step a1, when the temperature is not less than 80° C. (step a2), the process goes to a step a3 in which since it exceeds the operating environment, the host system is informed that the magnetic disk unit is not operable, and in order to prevent the magnetic disk unit from being damaged, the magnetic disk unit is stopped in operation. Further, in view of circumstances, there is a possibility that the heater and the Peltier element are operated, and thus instructions for stop of the operation of the heater and the Peltier element are issued. Furthermore, there is a possibility that the heat generating operation of the DCM and the VCM is performed, and thus instructions for stop of the heat generating operation of the DCM and the VCM are issued.

When the temperature is less than 80° C. and not less than 55° C. (step a4), the process goes to a step a5 in which the host system is informed that it is now cooling, and the Peltier element 24 performs the cooling operation. In view of circumstances, there is a possibility that the heat generating operation of the DCM and the VCM is performed, and thus instructions for stop of the heat generating operation of the DCM and the VCM are issued, and the selector 303 shown in FIG. 2 is switched so that the operational clock of 66 MHz is fed to the CPU 231 to suppress the generation of heat of the control circuit. Further, a "writing confirmation necessity" is informed a writing firmware. The "writing confirmation necessity" will be described later in conjunction with a flowchart of FIG. 5.

When the temperature is less than 55° C. and not less than 5° C. and the humidity is less than 80% (step a6), the process goes to a step a7, since it is environments in which the normal operation can be expected without any of heating and cooling. In view of circumstances, there is a possibility that the heater and the Peltier element are operated, or there is a possibility that the heat generating operation of the DCM and the VCM is performed. And thus in the step a7, the operation of the heater and the Peltier element is stopped, and the heat generating operation of the DCM and the VCM is stopped.

Further, in the step a7, the selector 303 can select any of the operational clock of frequency 100 MHz, and the operational clock of frequency 66 MHz in accordance with an instruction from the CPU 231 upon receipt of an instruction from the host system. In the event that it is out of the usual operational environment (cf. steps a5, a9 and a10), the selector 303 is compulsively switched to either one of the operational clock of frequency 100 MHz and the operational clock of frequency 66 MHz independently of an instruction from the host system. In the step a7, since it is in the usual operational environment, it is permitted to perform switching of the oscillator from the host system.

In the step a7, further, a "writing confirmation not necessity" is informed the writing firmware. In addition, up to here, in view of circumstances, there is a possibility that the outline doors (two doors 34 and 44 shown in FIG. 2) are opened, and thus the outline doors are closed.

When the temperature is less than 5° C. and not less than −10° C. or the humidity is not less than 80% (step a8), the process goes to a step a9 in which the host is informed system that the magnetic disk unit is in weak heating, and the heat generating operation of the heater is performed. With respect to the Peltier element, in view of circumstances, there is a possibility that the heat generating operation of the Peltier element is performed, and thus the heat generating operation of the Peltier element is stopped. The heat generating operation of the DCM and the VCM is performed. In order to increase generating heat of the control circuit, the oscillator is changed over to 100 MHz. A "writing confirmation necessity" is informed writing firmware, and in order to prevent condensation, the outline door is opened.

Further, when the temperature is less than −10° C. and not less than −30° C. (step a10), the process goes to a step a11 in the host is informed system that the magnetic disk unit is in strong heating, and the heat generating operation of both the heater and the Peltier element is performed. The heat generating operation of both the DCM and the VCM is performed. The oscillator is changed over to 100 MHz.

Under the low temperature environment, there is a high possibility that the DCM involves run-out due to deformation of the bearing. Thus, rotary driving of the DCM would cause the contact of the head with the disk and damage of the DCM. For this reason, a current conducts through a fixed phase so that the DCM is not rotated. Incidentally, in the event that only the specified one phase is set up for heating, the coil is easy to be damaged. Thus, it is acceptable that the phase is changed over for each heat operation.

Furthermore, when the temperature is less than −30° C. (step a10), the process goes to a step a12 in which the host is informed system that the magnetic disk unit is not to be operated, and in order to avoid damage of the magnetic disk unit, the operation of the magnetic disk unit is stopped, and operation of the heater and the Peltier element and heat generating operation of both the DCM and the VCM are stopped.

Performing heating and cooling in the manner as mentioned above make it possible to stably operate the magnetic disk unit even if the external environment is greatly varied.

Figure 5:
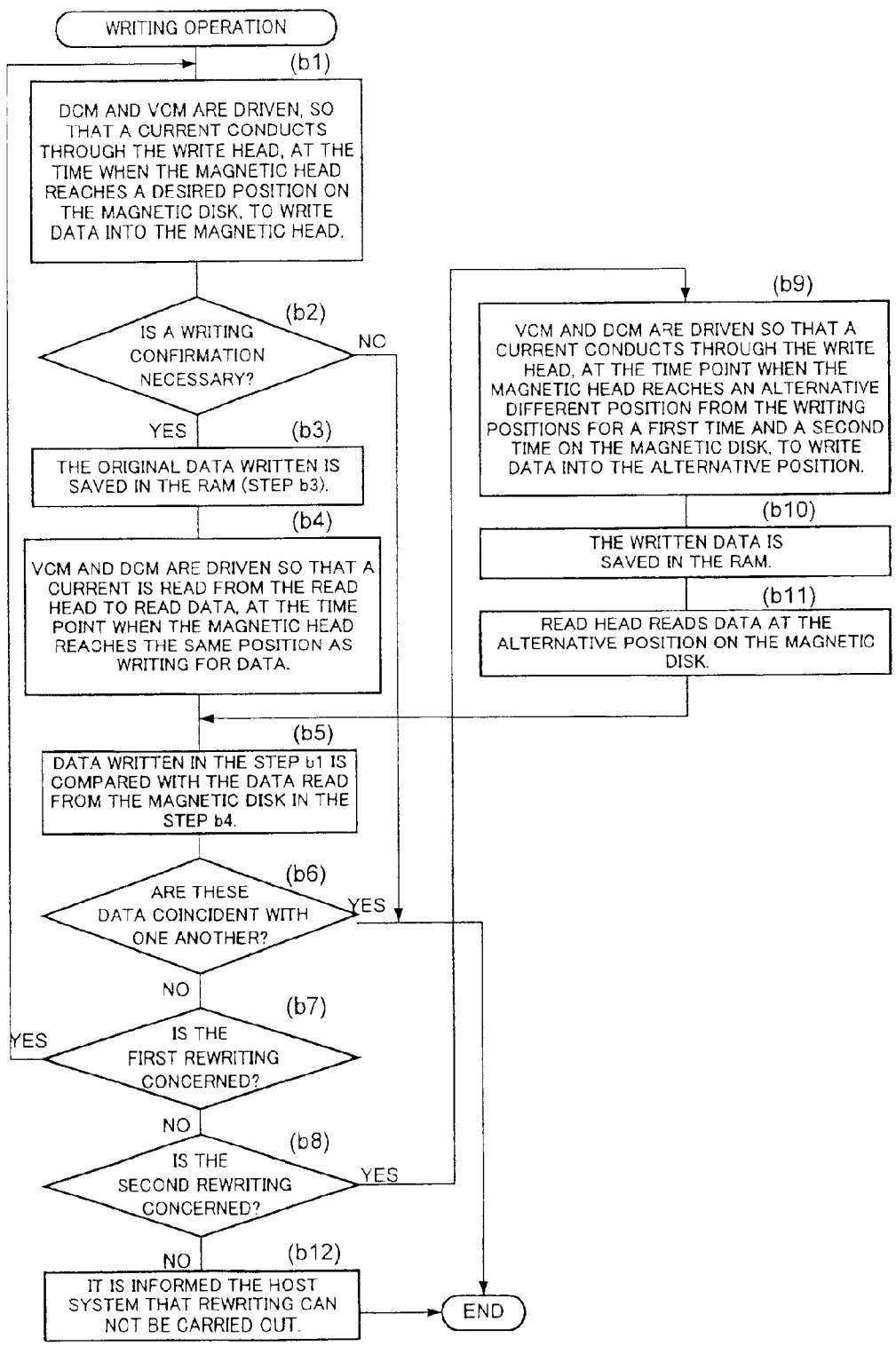
FIG. 5 is a flowchart useful for understanding a writing operation by a writing firmware.

FIG. 5 is a flowchart useful for understanding a writing operation by a writing firmware.

Here, first, the DCM and the VCM are driven, so that a current conducts through the WRITE head, at the time when the magnetic head reaches a desired position on the magnetic disk, to write data into the magnetic head (a step b1).

In step b2, it is decided as to whether a writing confirmation is necessary or unnecessary. The instruction of writing confirmation necessity or not necessity has been made in the step a5, a7 and a11.

When it is decided that the writing confirmation is unnecessary, the process terminates.

On the other hand, when it is decided that the writing confirmation is necessary, the original data written is saved in the RAM (step b3), and the VCM and the DCM are driven so that a current is read from the READ head to read data, at the time point when the magnetic head reaches the same position as writing for data (a step b4), and the data written in the step b1 (that is, the data saved in the RAM in the step b3) is compared with the data read from the magnetic disk in the step b4 (a step b5). When these data are coincident with one another (a step b6), at that time point, the process is terminated. When these data are not coincident with one another, it is decided as to whether the first rewriting is concerned (whether the first rewriting for the data of interest is performed). When it is decided that the first rewriting is concerned, the process returns to the step b1, and the processes of the step b1 to the step b6 are repeated. In this case, in the step b1, writing is performed at the same position as the first writing position on the magnetic disk. In the step b6, when it is again decided that these data are not coincident with one another even if the processes of the step b1 to the step b6 are repeated, the process goes via a step b7 to a step b8 in which it is decided that the second rewriting is concerned, and then the process goes to a step b9. In the step b9, the VCM and the DCM are driven so that a current conducts through the WRITE head, at the time point when the magnetic head reaches an alternative different position from the writing positions for a first time and a second time on the magnetic disk, to write data into the alternative position. In a step b10, the written data is saved in the RAM. In a step 11, the READ head reads data at the alternative position on the magnetic disk, and then the process returns to the step b5 in which the written data is compared with the read data.

When it is decided that these data are not coincident with one another through even twice rewriting, it is informed the host system that rewriting can not be carried out (a step b12).

In this manner, according to the present embodiment, when the operational environment is out of the normal one (here, for example, the temperature is not less than 5° C. and less than 55° C., and the humidity is not less than 80%), the writing confirmation and the rewriting are performed. This feature makes it possible to improve reliability up to the same degree as the usual operational environment, and also permits an operation of the magnetic disk unit in a wide range of environment in cooperation with the heating and the cooling.

FIGS. 6 to 10 are views each showing an example of an outline of a double-structure.

In FIGS. 6 to 10, the movable section 11 shown in FIG. 2 is omitted.

Figure 6:
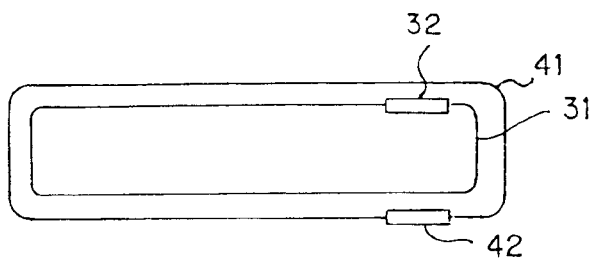
FIG. 6 is a view showing an example of an outline of a double-structure.

FIG. 6 shows an example of an outline of a double-structure having a first outline 31 and a second outline 41, which are provided with air vents 32 and 42, respectively. As in the present example, simply providing the outline of the simple double-structure makes it possible to control the environment of the inside of the first outline 31 independently of the environment of the outside of the second outline 41, and thereby spreading the operable environment.

Figure 7:
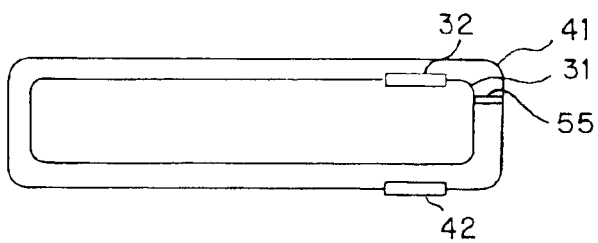
FIG. 7 is a view showing an example of an outline of a double-structure.

FIG. 7 shows an example of an outline of a double-structure, which is the same as one shown in FIG. 6, but a partitioning plate 55 being provided. The partitioning plate 55 blocks a path coupling the air vent 32 of the first outline 31 with the air vent 42 of the second outline 41 by the short distance in the space formed between the first outline 31 and the second outline 41. The use of the partitioning plate 55 permits two the air vents 32 and 42 to be coupled with one another by only the bypassed path. This feature makes it possible to further separate the environments of the inside of the first outline 31 and the outside of the second outline 41 from one another.

Figure 8:
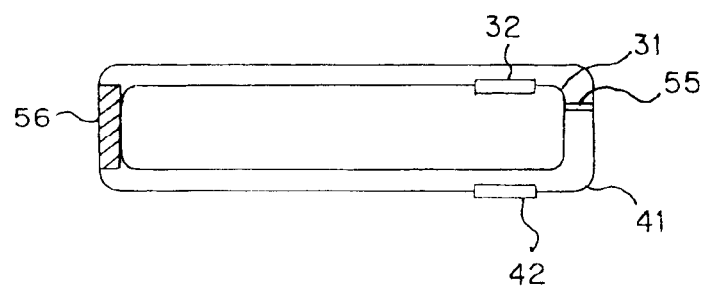
FIG. 8 is a view showing an example of an outline of a double-structure.

FIG. 8 shows an example of an outline of a double-structure, which is the same as one shown in FIG. 7, but a silica gel 56 being provided in mid way of the path coupling two the air vents 32 and 42 with one another. The use of the silica gel 56 serves to dehumidify the air passing through the bypassed path. This feature makes it possible to further separate the environments of the inside of the first outline 31 and the outside of the second outline 41 from one another.

Figure 9:
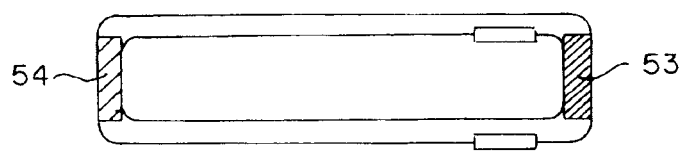
FIG. 9 is a view showing an example of an outline of a double-structure.

FIG. 9 shows an example of an outline of a double-structure, in which the partitioning plate 55 in the structure shown in FIG. 8 is replaced by a small silica gel 53, and a large silica gel is placed on the bypassed path. In this case, this structure serves to dehumidify the air passing through the air vents 32 and 42, and provide a tendency that the air is induced to the bypassed path.

Figure 10:
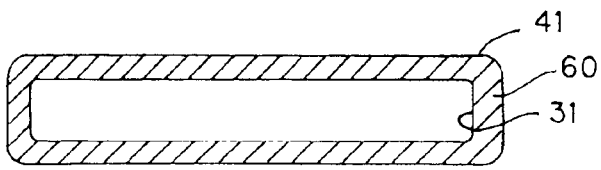
FIG. 10 is a view showing an example of an outline of a double-structure.

FIG. 10 shows an example of an outline of a double-structure, in which silica gel (dehumidifying and moisture absorption agent) or glass wool (heat-insulating agent) is filled up between the first outline 31 and the second outline 41. In this case, there is no need that the first outline 31 and the second outline 41 are a rigid body, and it is acceptable that they are a flexible material (for example, ones made of thin vinyl). In this manner, even if the movable section 11 (cf. FIG. 2) is constructed with such a structure that dehumidifying and moisture absorption agent or heat-insulating agent is filled up between the first outline and the second outline, it is possible to stabilize environments of the movable section 11 with a considerable degree regardless of variation of the external environment.

Incidentally, while the present invention is explained raising a magnetic disk unit by way of example, the present invention is not restricted to a unit in which the magnetic disk unit is constructed in form of unit of the magnetic disk unit. It is acceptable that the present invention is applicable also to an information processing apparatus having the magnetic disk unit according to the present embodiments as mentioned above, for example, GPS, car navigation system, and a car audio system. Further, the present invention is widely applicable to not only a magnetic disk unit, but also a disk unit and an information processing apparatus having the disk unit, for example, a magneto-optical disk unit and an information processing apparatus having the magneto-optical disk unit.

As mentioned above, according to the present invention, it is possible to implement a disk unit and an information processing apparatus capable of operating under a wide external environment.

While the present invention has been described with reference to the particular illustrative embodiments, it is not to be restricted by those embodiments except as defined in the appended claims. It is to be appreciated that those skilled in the art can change or modify the embodiments without departing from the scope of the present invention as defined in the appended claims.

What is claimed is:

1. A disk unit in which an arm having a head on a top is actuated, while a disk is rotated, so that a position of the head is moved with respect to the disk to perform write and read of data to and from the disk by the head, said disk unit comprising:

a temperature sensor for detecting a temperature;

heating means for generating heat when said temperature sensor detects a temperature which is less than a predetermined first temperature;

a control circuit for controlling said heating means to generate heat when said temperature is less than said predetermined first temperature; and an outline for housing at least said temperature sensor, said heating means and said control circuit, said outline having an aperture which is configured and adapted to be selectively opened and closed by said control circuit for controlling the temperature inside said outline.

2. A disk unit according to claim 1, wherein said disk unit further comprises a first motor for driving said disk, and said heating means includes means for heating by conducting a current through a fixed phase of said first motor.

3. A disk unit according to claim 1, wherein said disk unit further comprises a second motor for driving said arm, and said heating means includes means for heating by conducting through said second motor a current which is unnecessary for operation of said arm.

4. A disk unit according to claim 1, wherein said heating means includes a heater.

5. A disk unit according to claim 1, wherein said heating means includes a Peltier element.

6. A disk unit according to claim 1, further comprising:
heat generation suppressing means for suppressing generation of heat when said temperature sensor detects a temperature exceeding a predetermined third temperature higher than said predetermined first temperature.

7. A disk unit according to claim 6, wherein said heat generation suppressing means includes a Peltier element.

8. A disk unit according to claim 6, wherein said disk unit further comprises a communication circuit for communication with a host, and when said temperature sensor detects a temperature exceeding the third temperature, said communication circuit informs the host that generation of heat is suppressed.

9. A disk unit according to claim 1, wherein said control circuit controls an operation of said disk unit, and when said temperature sensor detects a temperature exceeding a predetermined fourth temperature which is higher than the third temperature, said control circuit stops the operation of said disk.

10. A disk unit according to claim 9, wherein said disk unit further comprises a communication circuit for communication with a host, and when said temperature sensor detects a temperature exceeding the fourth temperature, said communication circuit informs the host that said disk unit is not operable.

11. A disk unit in which an arm having a head on a top is actuated, while a disk is rotated, so that a position of the head is moved with respect to the disk to perform write and read of data to and from the disk by the head, said disk unit comprising:
a temperature sensor for detecting a temperature;
a clock generating circuit for generating a plurality of sorts of operational clocks which are mutually different in frequency;
a control circuit for controlling an operation of said disk unit in such a manner that upon receipt of any one sort of operational clock from said clock generating circuit, a processing is performed at a processing speed according to a frequency of the received operational clock, wherein said control circuit operates at a different operational clock in accordance with a temperature detected by said temperature sensor; and
an outline for housing at least said temperature sensor, said clock generating circuit and said control circuit, said outline having an aperture which is configured and adapted to be selectively opened and closed by said control circuit for controlling the temperature inside said outline.

12. A disk unit according to claim 1, wherein said disk unit further comprises a communication circuit for communication with a host, and when said temperature sensor detects a temperature which is less than the first temperature, said communication circuit informs the host that heating is performed.

13. A disk unit according to claim 1, wherein said control circuit controls an operation of said disk unit, and when said temperature sensor detects a temperature which is less than a predetermined second temperature lower than the first temperature, said control circuit stops the operation of said disk.

14. A disk unit according to claim 13, wherein said disk unit further comprises a communication circuit for communication with a host, and when said temperature sensor detects a temperature which is less than the second temperature, said communication circuit informs the host that said disk unit is not operable.

15. A disk unit in which an arm having a head on a top is actuated, while a disk is rotated, so that a position of the head is moved with respect to the disk to perform write and read of data to and from the disk by the head, said disk unit comprising:
a temperature sensor for detecting a temperature;
a control circuit for controlling an operation of said disk unit; and
an outline having a door which opens and closes in accordance with a control,
wherein said control circuit causes said door to open when said temperature sensor detects a temperature which is less than a predetermined temperature.

16. A disk unit in which an arm having a head on a top is actuated, while a disk is rotated, so that a position of the head is moved with respect to the disk to perform write and read of data to and from the disk by the head, said disk unit comprising:
a temperature sensor for detecting a temperature; and
an access circuit for accessing said disk; and
an outline for housing at least said temperature sensor and said access circuit, said outline having an aperture which is configured and adapted to be selectively opened and closed by said access circuit for controlling the temperature inside said outline;
wherein said access circuit performs, when writing of data into said disk is performed in a case where said temperature sensor detects a temperature which is out of a predetermined temperature range, a writing confirmation operation for comparing written data with read data through reading data written into said disk.

17. A disk unit according to claim 16, wherein said access circuit again writes the written data into a same area on said disk and again reads the written data in a case where it is decided by the writing confirmation operation that the written data is not coincident with the read data, and said access circuit writes the written data into a different area on said disk in a case where it is again decided by the writing confirmation operation that the written data is not coincident with the read data.

18. A disk unit in which an arm having a head on a top is actuated, while a disk is rotated, so that a position of the head is moved with respect to the disk to perform write and read of data to and from the disk by the head, said disk unit comprising:
a humidity sensor for detecting a humidity;
heating means for generating heat when said humidity sensor detects a humidity exceeding a predetermined humidity; and
a control circuit for controlling said heating means to generate heat when said temperature is less than said predetermined humidity; and
an outline for housing at least said humidity sensor, said heating means and said control circuit, said outline having an aperture which is configured and adapted to be selectively opened and closed by said control circuit for controlling the humidity inside said outline.

19. A disk unit according to claim 18, wherein said disk unit further comprises a first motor for driving said disk, and said heating means includes means for heating by conducting a current through a fixed phase of said first motor.

20. A disk unit according to claim 18, wherein said disk unit further comprises a second motor for driving said arm, and said heating means includes means for heating by conducting through said second motor a current which is unnecessary for operation of said arm, at time of stop of operation of said arm.

21. A disk unit according to claim 18, wherein said heating means includes a heater.

22. A disk unit according to claim 18, wherein said heating means includes a Peltier element.

23. A disk unit according to claim 18, wherein said disk unit further comprises a communication circuit for communication with a host, and when said humidity sensor detects a humidity exceeding the predetermined humidity, said communication circuit informs the host that heating is performed.

24. A disk unit in which an arm having a head on a top is actuated, while a disk is rotated, so that a position of the head is moved with respect to the disk to perform write and read of data to and from the disk by the head, said disk unit comprising:
   a humidity sensor for detecting a humidity;
   a clock generating circuit for generating a plurality of sorts of operational clocks which are mutually different in frequency; and
   a control circuit for controlling an operation of said disk unit in such a manner that upon receipt of any one sort of operational clock from said clock generating circuit, a processing is performed at a processing speed according to a frequency of the received operational clock, wherein said control circuit operates at a different operational clock in accordance with a humidity detected by said humidity sensor; and
   an outline for housing at least said humidity sensor, said clock generating circuit and said control circuit, said outline having an aperture which is configured and adapted to be selectively opened and closed by said control circuit for controlling the humidity inside said outline.

25. A disk unit in which an arm having a head on a top is actuated, while a disk is rotated, so that a position of the head is moved with respect to the disk to perform write and read of data to and from the disk by the head, said disk unit comprising:
   a humidity sensor for detecting a humidity;
   a control circuit for controlling an operation of said disk unit; and
   an outline having a door which opens and closes in accordance with a control,
   wherein said control circuit causes said door to open when said humidity sensor detects a humidity exceeding a predetermined humidity.

26. A disk unit in which an arm having a head on a top is actuated, while a disk is rotated, so that a position of the head is moved with respect to the disk to perform write and read of data to and from the disk by the head, said disk unit comprising:
   a humidity sensor for detecting a humidity; and
   an access circuit for accessing said disk; and
   an outline for housing at least said humidity sensor and said access circuit, said outline having an aperture which is configured and adapted to be selectively opened and closed by said access circuit for controlling the humidity inside said outline;
   wherein said access circuit performs, when writing of data into said disk is performed in a case where said humidity sensor detects a humidity exceeding a predetermined humidity, a writing confirmation operation for comparing written data with read data through reading data written into said disk.

27. A disk unit according to claim 26, wherein said access circuit again writes the written data into a same area on said disk and again reads the written data in a case where it is decided by the writing confirmation operation that the written data is not coincident with the read data, and said access circuit writes the written data into a different area on said disk in a case where it is again decided by the writing confirmation operation that the written data is not coincident with the read data.

28. A disk unit in which an arm having a head on a top is actuated, while a disk is rotated, so that a position of the head is moved with respect to the disk to perform write and read of data to and from the disk by the head, said disk unit comprising:
   a double-structure outline having a top, a bottom, a first outline and a second outline surrounding said first outline; and
   a dehumidifying agent provided in a space between the first outline and the second outline;
   wherein said top and said bottom are in fluid communication via said space.

29. A disk unit according to claim 28, further including a heat-insulating body provided in said space between the first outline and the second outline.

30. A disk unit according to claim 28, wherein each of the first outline and the second outline has an air vent, and said disk unit further comprises means for blocking or relatively lowering a flow of air in an area coupling the air vent of the first outline with the air vent of the second outline, of said space formed between the first outline and the second outline.

* * * * *

UNITED STATES PATENT AND TRADEMARK OFFICE
CERTIFICATE OF CORRECTION

PATENT NO. : 6,867,939 B2
DATED : March 15, 2005
INVENTOR(S) : Katahara et al.

It is certified that error appears in the above-identified patent and that said Letters Patent is hereby corrected as shown below:

Title page,
Item [56], References Cited, OTHER PUBLICATIONS, please insert the following:
-- Moran, M.E, "Modifying Spaceborne Computer Drives for Conduction Cooling," *Electronic Packaging & Production, Cashiers Publishing Co.*, Newton, MA, Vol. 37, No. 11; August 1997.

"Distributed Vehicular Computer Systems," Research Disclosure, *Kenneth Mason Publications*, Hampshire, GB, No. 380, December 1, 1995, pg. 830.

"Anti-Condensation Heating by Heat-Conductive Printed Circuit Board," *IBM Technical Disclosure Bulletin, IBM Corp.*, New York, NY, Vol. 33, No. 1A, June 1990, pg. 478. --.

Signed and Sealed this

Sixteenth Day of August, 2005

JON W. DUDAS
*Director of the United States Patent and Trademark Office*